(No Model.)
J. B. HABERLE.
SPRINKLER.
No. 528,252.  Patented Oct. 30, 1894.
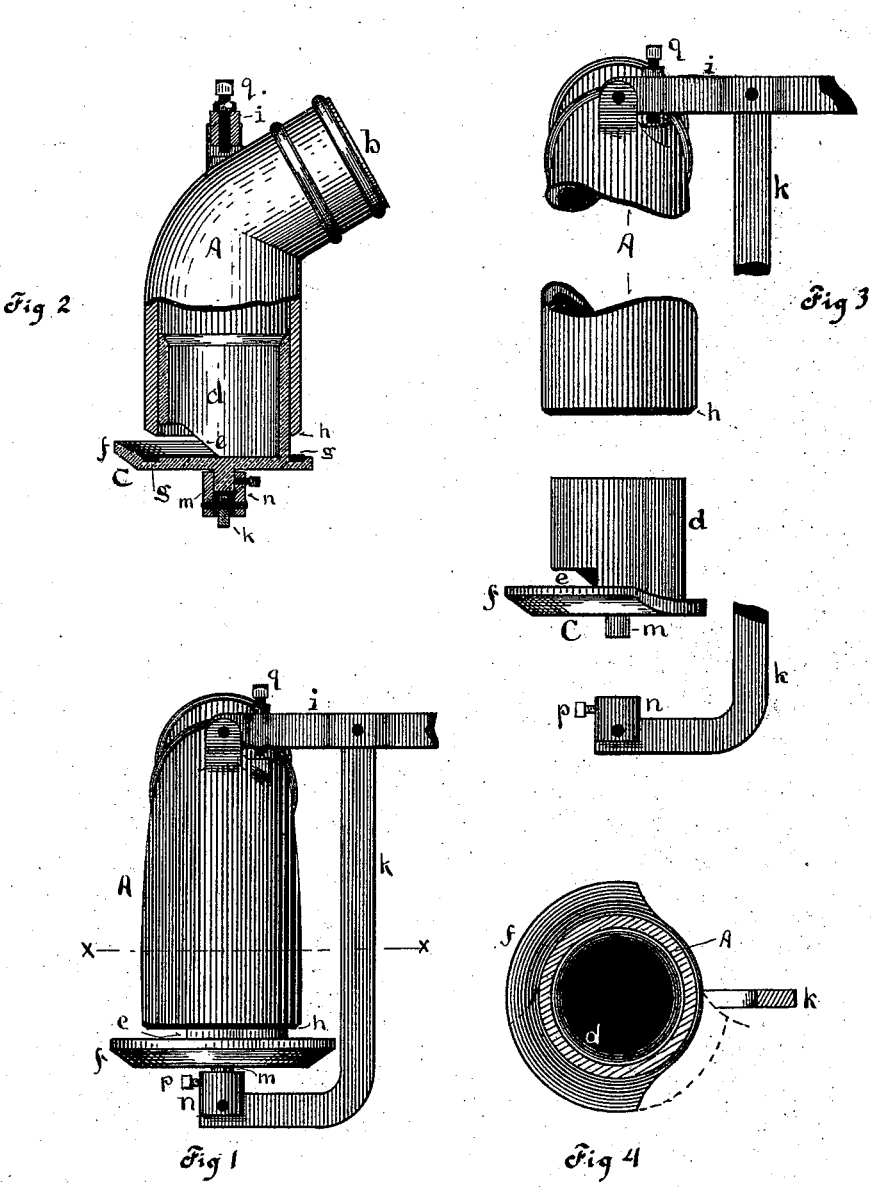
WITNESSES:
Elliott F. Aldrich
E. S. Buck
INVENTOR
John B. Haberle
BY
R. D. O. Smith
ATTORNEY.

UNITED STATES PATENT OFFICE.

JOHN B. HABERLE, OF SOUTH BEND, INDIANA, ASSIGNOR TO THE STUDEBAKER BROTHERS MANUFACTURING COMPANY, OF SAME PLACE.

SPRINKLER.

SPECIFICATION forming part of Letters Patent No. 528,252, dated October 30, 1894.

Application filed March 31, 1893. Serial No. 468,543. (No model.)

*To all whom it may concern:*

Be it known that I, JOHN B. HABERLE, of South Bend, in St. Joseph county, in the State of Indiana, have invented new and useful Improvements in Sprinklers for Streets, &c.; and I do hereby declare that the following is a full and accurate description of the same, reference being had to the accompanying drawings, wherein—

Figure 1 is a front elevation of my sprinkler. Fig. 2 is a side elevation of the same, partly in section. Fig. 3 is an elevation showing the parts broken, and detached. Fig. 4 is a sectional plan on line *x—x*.

My invention relates that class of sprinklers wherein there is a cylindrical head which receives water from the wagon tank, through a proper hose or conduit, and fixed to the extremity of said head, a plate to close the open end of said head except a slit on one side through which the water jet escapes; said plate having an upturned lip by which the issuing water is deflected and spread in a thin broad sheet. Heretofore also a valve has always been placed at some point between the water in the reservoir and the issue slit or jet to cut off and arrest the flow of water from said tank—and commonly, within said head or cylinder; and when so placed, said valve has been operated by a valve rod which is provided with a gland and stuffing box, to prevent waste of water around said rod.

My invention employs a movable plate instead of a fixed one, and an operative mechanism entirely exterior to the sprinkler head. My plate is movable to permit a flow of water, to regulate the same or to close it off as a valve, as the case may require.

A is the cylindrical sprinker head, provided with the neck or hose connection *b*, through which water passes from the wagon tank to the interior of said head. The plate C, is fitted to the open end *h* of the head, and is provided with a guiding portion, preferably a thimble fitted to move snugly in the cylindrical interior of the head A. The thimble *d*, is formed to permit a flow of water at one side, preferably through a slot *c*, and in front of said slot the plate may be provided with a deflecting lip *f*, but a lateral extension of said lip is not essential. Immediately around the base of the thimble *d*, a gasket *g*, may be placed upon which the edge or extremity *h* of the head A, will seat itself as a valve, when said plate has been closed upon said gasket *h* for that purpose.

The plate C, with its thimble *d*, may be rotated in the head A and thereby the jet slot *e*, and lip *f* may be adjusted to project the issuing water in any desired direction; i. e., toward the rear, toward the side or in any intermediate direction as desired.

The operative mechanism I have used, consists of a lever *i* one end of which, for convenience, I pivot on the back of the head A though it is manifest said lever may be pivoted at some other convenient point, to some other convenient part of the apparatus.

The free end of the lever *i* is under control of the attendant so that he can, at will, operate said lever to regulate or cut off the water flow.

A hook or stirrup rod *k*, is attached by a pivot pin to the lever *i* and at its lower extremity it passes to the exterior center of said plate, or thereabout, where it is made fast to said plate, and causes the same to be raised or lowered in accordance with the movements of the lever *i*.

As I have constructed the apparatus, I have provided the middle exterior surface of the plate C with a stud *m*, and the hook *k*, at its extremity with a socket piece *n*, to receive said stud, and a set screw *p*, serves to fasten said stud in said socket, and thereby connect the plate C and hook *k*, and it also serves to hold the plate in the required rotary adjustment.

An adjusting screw *q* serves to limit the movement of the lever *i* to open the water jet and said screw may be set so as to limit said movement and jet opening to any point within its possible range of motion.

It will be understood, of course that the part *d* may be fitted to the exterior surface of the head if desired and that the stirrup and its mode of attachment to the movable plate may differ from that shown without changing the nature or effect of the invention in any way.

Having described my invention, I claim—

1. The sprinkler head A a stirrup *k* and plate C pivoted to said stirrup and provided with its thimble $d$, jet opening $e$ and deflecting lip $f$ all capable of rotation on said pivot as to said head whereby the issuing jet may be projected to the rear or to the side as may be desired.

2. The sprinkler head A, and plate C provided with the stud $m$, combined with the lever $i$ hook $k$, socket $n$, and means for locking said stud and stirrup hook together for the purpose set forth.

JOHN B. HABERLE.

Witnesses:
 MARCUS W. DOOLITTLE,
 FREDERICK SCHAFER.